United States Patent [19]

Mayr et al.

[11] 3,725,542
[45] Apr. 3, 1973

[54] INTRAMUSCULAR VACCINATION PROGRAM AND VACCINE AGAINST RHINOPNEUMONITIS AND PROCESS FOR PREPARING IT

[75] Inventors: Anton Mayr, Munich; Kurt Wagener, Hannover; Johann Ditrich Adolf Heinrich Pette, deceased, Munich by Christiane Wilhelmine Pette, administratrix; Klaus Petzoldt, Freiburg/Breisgau, all of Germany

[73] Assignee: Behringwerke Aktiengesellschaft, Marburg/Lahn, Germany

[22] Filed: Jan. 24, 1972

[21] Appl. No.: 220,456

Related U.S. Application Data

[63] Continuation-in-part of Ser. No. 166,260, July 26, 1971, which is a continuation of Ser. No. 804,742, March 4, 1969, abandoned.

[30] Foreign Application Priority Data

Mar. 6, 1968 Germany.....................P 16 92 043.7

[52] U.S. Cl. ......................424/89, 195/1.3, 195/1.8
[51] Int. Cl...........C12k 9/00, C12k 7/00, C12k 5/00
[58] Field of Search ...................424/89; 195/1.3, 1.8

[56] References Cited

OTHER PUBLICATIONS

Mayr et al. ZENT Bl. Vet. Med. 15B–406–418 April 1969 Studies on the Development of a Live Vaccine Against Equine Rhinopneumonitis (Abortion of Mares)
Peacock JAVMA 155:310–312 (July 15, 1969) Biological Requirements and Control of Equine Phinopneumonitis Vaccine (Live Virus)
Koch ZENT Bl. Vet. Med. 14B:493–506(1967) Comparative Studies on the Behaviour of Equine Rhinopneumonitis Virus in Cell Cultures Vet. Bull. 38 No. 1392 (1968)
Brion et al. Bull. Acad. Vet. Fr. 40:89–93(1967) Recommendations for Prophylactic Measures Against Abortion Due to Rhino-Pneumonitis Virus in Mares. Vet. Bull. 37 No. 5149(1967)
Doll et al. Cornell Vet 53:249–262(1963) A Planned Infection Program for Immunizing Mares Against Viral Rhinopnemonitis Vet. Bull. 33 No. 3135(1963)
McCollum et al. Cornell Vet 52:164–173 (1962) Isolation and Propagation of Equine Rhinopneumonitis Virus in Primary Monolayer Kideny Cell/Cultures of Domestic Animals Vet. Bull. 32 No. 3025(1962)
Doll JAVMA 139:1324–1330 Dec. 15, 1961 Immunization Against Viral Rhinopneumonitis of Horses with Live Virus Propagated in Hamsters Vet. Bull. 32 No. 1493 (1962)
Shimizu et al. C.R. Soc. Biol. 153:876–879(1959) Isolation of the Virus of Equine Abortion in Tissue Cultures of Horse Kidney Vet. Bull. 30 No. 1040(1960)

*Primary Examiner*—Shep K. Rose
*Attorney*—Henry W. Koster et al.

[57] ABSTRACT

Method of preparing a vaccine effective against equine rhinopneumonitis which comprises attenuating rhinopneumonitis virus, after initial cultivation, by continuous passage through primary cell cultures of tissues not originating in *equidae*, e.g. piglet kidney cell cultures, until it has lost pathogenicity for the horse. A parenterally administrable vaccine prepared in this manner. A method for immunizing horses and an intramuscular vaccination program against equine rhinopneumonitis in horses.

4 Claims, No Drawings

INTRAMUSCULAR VACCINATION PROGRAM AND VACCINE AGAINST RHINOPNEUMONITIS AND PROCESS FOR PREPARING IT

It is a continuation-in-part application of application Ser. No. 166 260 filed July 26, 1971, which application, in turn, is a continuation of application, Ser. No. 804 742 filed Mar. 4, 1969 and now abandoned.

The present invention relates to an intramuscular vaccination program against equine rhinopneumonitis in horses, to a vaccine against rhinopneumonitis infection of horses (viral abortion of mares) and to a process for preparing it.

The rhinopneumonitis virus (virus abortifacient in mares) causes a respiratory disease predominantly in foals and often abortion of pregnant mares. The virus belongs to the group of herpes viruses and is widespread over the world. In a stud, the virus can cause great economic losses. Hitherto, it has not been possible in horse breeding to successfully prevent the viral epidemic abortion of mares by vaccination. Attempts to prepare an effective vacccine against the abortion of mares from inactivated or attenuated viruses failed.

Thus, it was attempted to use for the vaccination of horses against viral rhinopneumonitis a live virus slightly attenuated by passage in hamsters (E.R. Doll, Vet. Bull. 32, 1493). Such live virus (in the following called Doll-vaccine though it is not a true vaccine) is inoculated nasally to the animals. The treatment with this vaccine, however, is acknowledged in the prior art to be defective in several aspects. Thus, G.V. Peacock in "Biological Requirements and Control of Equine Rhinopneumonitis Vaccine (Live Virus)," J.A.V.M.A. 155(1969) 310 – 312 describes the experiences in practice of the use of the Doll vaccine and its "limitations, dangers, and expected benefits." The article emphasizes that use of the product does, in some cases, lead to abortion because of the virulence of the virus contained therein. Use of the material must be under carefully controlled conditions, and it is noted that for commercial distribution the material is labelled as a "-virus," rather than as a "vaccine," to point up the special precautions which must be taken with its use. In conclusion, the article stresses the desirability, from the standpoint of safety, of replacing the material now in use with "a refined vaccine," and of the desirability of a vaccine permitting parenteral administration in contrast to administration by the respiratory route, as is required of the prior art virus. Vet. Bull. 32, 1493 indicates a 1 percent abortion rate in mares to which the Doll-vaccine had been administered, at least one-third of which is directly attributable to the vaccine virus. Vet. Bull. 33, 3135 also states the possibility of abortion from the hamster-adapted virus if administered to mares late in gestation.

Vet. Bull. 37, 5149, specifically advises against the use of the vaccine in France because of the residual virulence of the virus for horses and the danger of transmission of disease.

It is furthermore known to use animal kidney cultures, particularly of pigs, for the isolation, propagation and passage of strains of the rhinopneumonitis virus. (Vet. Bull. 30, 1040; 32; 3025 and 38, 1392). There is, however, no teaching in the state of the art that a repeated passage of the virus through tissue cell cultures, such as those of pig kidneys, would lead to such attenuation of the virus as renders it suitable for use as a vaccine against equine rhinopneumonitis.

The present invention provides an intramuscular vaccination program as well as a suitable vaccine against the viral rhinopneumonitis infection of horses (viral abortion of mares) and a process for preparing it, wherein rhinopneumonitis virus, after initial cultivation, is attenuated by continuous passage through primary cell cultures from tissues that do not originate from equidae (Ungulata perissodactyla), until it has lost those of its properties which are pathogenic for the horse organism, and, if desired, the virus-containing harvests are combined with an adjuvant.

More particularly the invention provides an intramuscular vaccination program against equine rhinopneumonitis (abortion of mares) in horses which consists in the steps of vaccinating, intramuscularly, a) foals at three months of age, and revaccinating foals intramuscularly three months later; and b) pregnant mares with a first dose between the second and third months of pregnancy and a second dose at the sixth to seventh months of pregnancy, with an intramuscular vaccine prepared by:

cultivating and multiplying rhinopneumonitis viruses, derived from a source selected from infected horses, infected foals, and aborted horse fetuses, in susceptible tissues selected from susceptible organs, susceptible test animals, and susceptible permanent cells lines suitable for the cultivation and multiplication of said viruses, said multiplying involving from three to 10 passages;

completely attenuating the viruses until they have lost pathogenicity for the horse by passing the viruses, in at least 20 continuous passages, through primary cell cultures selected from kidneys of sheep, pigs, and piglets and from stable permanent cell lines derived from said primary cell cultures;

harvesting the virus-containing material, combining the harvested material with an aluminum hydroxide or phosphate adjuvant, and freeze drying the material;

said harvested material meeting the following criteria for complete attenuation:

a. the infectuosity titer for golden hamsters after intraperitoneal infection must be reduced by 3 powers of 10 with respect to the starting value;

b. over 70 percent of golden hamsters, inoculated with the attenuated virus (0.5 ml, parenterally) and 3 weeks later infected intraperitoneally with the virulent starting virus (10,000 $LD_{50}$/ml), must survive the challenge infection;

c. highly pregnant mares between the 7th and 9th month of pregnancy, which are susceptible to the viral abortion virus, must not become diseased and abort after intramuscular or subcutaneous injection of the attenuated virus (5 ml, virus titer between $10^{6.5}$ and $10^{7.5}$ $CID_{50}$/ml) and local vaccination reactions must not occur (after the first vaccination, a short-time biphasal fever attack between the 18th and the 48th hour and between the 8th and the 9th day is unobjectionable; after the second vaccination, however, no fever reaction must occur); and d. foals at the age of 2 – 3 months which do not have specific antibodies against rhinopneumonitis virus must not become diseased after parenteral injection with the attenuated virus. The invention further provides a process for the manufacture of a vaccine characterized by the forementioned steps and the vaccine itself as well as a method of protecting horses against equine rhinopneumonitis by vaccinating them with the vaccine.

As the virus of rhinopneumonitis (virus abortifacient in mares), the equine herpes virus I, i.e. the rhinopneumonitis virus, is used. As rhinopneumonitis virus strains, there may be mentioned, for example, the strains RAC-H, Hannover 1835, Army 183 and Ky-D. The rhinopneumonitis virus may be obtained, for example from smears of mucus taken from the nostrils of foals, from homogenized organs of an aborted horse fetus, or from various organs of unviable newborn dead foals.

The cultivation of the viruses can be effected in known manner in cell cultures (cf. DULBECCO and VOGT, J. exp. Med. 99, (1954), page 167, and YOUNGNER, Proc. Soc. exp. Biol. Med. 85, (1954), page 202) or in animals. It serves the purpose of isolating and multiplying the virus in order to obtain sufficient material for further investigations such as passages, titrations and neutralization tests. In general, isolation is followed by 3 to 10 multiplication passages.

As starting materials for the preparation of the cell cultures for the cultivation and multiplication of the viruses, there may be used organs such as kidneys, spleens, testes, skin of horses, cattle, pigs, sheep, goats, monkeys and of small test animals such as golden-hamsters and rabbits, as well as permanent cell lines, for example BHK-21-cells, AND-cells, HeLa-cells, PK 15-cells and RK-13-cells. The cultivation of the viruses may also be carried out in test-animals, for example in gold-hamsters. Preferably, however, kidneys of horses or piglets and golden hamsters are used.

The attenuation is effected in cell cultures which are not derived from equidae. As primary cell cultures, there may be mentioned for example, those which are preferably obtained from organs of hoof and claw animals (order ungulata), with the exception of equidae, especially from kidneys of sheep and pigs, preferably piglets. Cell cultures from stable cell-lines may also be used for the attenuation.

THe number of passages to be carried out until the rhinopneumonitis virus loses its properties which are pathogenic for the host organism, i.e. for the horse, depends largely on the nature of the cell cultures used. Thus, 20 to 40, preferably 25 to 30, passages through cultures from sheep kidneys or also 240 to 300, preferably 250 to 280, passages through cultures from piglets' kidneys lead to attenuation. For a complete attenuation, the following criteria are decisive:

a. The infectivity titer for golden hamsters after intraperitoneal infection must be reduced by 3 powers of 10 with respect to the starting value. For the titrations, dilution series in powers of 10 are prepared and, for each dilution, 4 golden hamsters are vaccinated intraperitoneally with 0.2 ml each of the dilution and the titer is then calculated according to the method of BEHRENS, B., Arch. exp. Path. Pharmak. 140, 237 (1929) and KARBER, G., Arch, exp. Path. Pharmak. 162, 480 (1931).

b. The immunizing properties (antigenicity) in golden hamsters toward the starting virus must be maintained. For this purpose, golden hamsters are inoculated with the attenuated virus (0.5 ml, parenterally) and 3 weeks later infected intraperitoneally with the virulent starting virus (10,000 $LD_{50}$/ml). Over 70 percent of the animals subjected to the test must survive this challenge infection.

c. Highly pregnant mares between the 7th and 9th month of pregnancy, which are susceptible to the viral abortion virus, must not become diseased and abort after intramuscular or subcutaneous injection of the attenuated virus (5 ml, virus titer between $10^{6.5}$ and $10^{7.5}CID_{50}$/ml). Local vaccination reactions must not occur. A short-time bi-phasal fever attack between the 18th and the 48th hour and between the 8th and the 9th day is unobjectionable for the first vaccination. After the second vaccination, however, no fever reaction must occur.

d. Foals at the age of 2 – 3 months which do not have specific antibodies against rhinopneumonitis virus must not become diseased after parenteral injection with the attenuated virus (5 ml, virus titer between $10^{6.5}$ and $10^{7.5}CID_{50}$ml). A short rise of temperature is unobjectionable (cf. under c).

If an adjuvant is to be added, there may be used, for example mineral adjuvants, preferably aluminum hydroxide and aluminum phosphate. Other additives and auxiliary agents which are conventionally used in the production of vaccines, for example stabilizers, may also be added.

The vaccine should have a titer of from $10^{6.00}$ to $10^{7.50}$ $CID_{50}$/ml, preferably $10^{7.50}CID_{50}$/ml.

If desired, the vaccine may also be freeze-dried. The potency of the vaccine of the present invention was tested in pregnant mares. For this purpose, three pregnant mares, carrying in the 2nd to 3rd month and/or in the 7th to 8th pregnancy month, were vaccinated with the vaccine of the present invention, while one control animal was left unvaccinated. In the period of from the 9th to the 11th month of pregnancy viral abortion of mares occurs (in the last trimester of pregnancy), the test animals were infected with 10 ml of the infections rhinopneumonitis virus (strain Hannover 1835) by subcutaneous injection. At the end of the normal period of pregnancy the three immunized animals gave birth to healthy foals, whereas the control animal aborted due to the infection.

The preparation of the cell cultures is carried out and the passages are effected in known manner. A suitable method of realizing the process of the present invention is described hereinafter:

Kidneys of sheep or piglets are comminuted mechanically; in order to digest the intercellular substance, a 0.25 percent trpysin solution in phosphate buffer having a pH of 7.6 was added. Thereby, the cells separate individually from the tissue but remain uninfluenced by the trypsin and retain their capacity to divide. The cells, which are suspended in the trypsin solution, are isolated by centrifugation, washed several times, for example with phosphate buffered 0.85 percent sodium chloride solution, and then resuspended in a culture medium.

As culture media, Hanks' solution, Earle's solution and Eagle's medium, Tissue Culture Medium 199 (TCM 199) with lactalbumin-hydrolysate, calf serum and amniotic liquid, preferably bovine amniotic liquid, as well as virus medium VM 2a are suitable, for example.

A preferred culture medium is Hanks' or Earle's solution with 0.5 percent of lactalbumin-hydrolysate, 10 percent of calf serum, antibiotics, for example 100 IU penicillin and 50 gamma streptomycin or 100 gamma dihydrostreptomycin/ml, and 0.01 percent of phenol red as indicator. The pH of the culture medium is adjusted to a value in the range of from 7.0 to 7.5, preferably 7.3, by adding bicarbonate or by passing through 5 percent of carbon dioxide gas.

The cells suspended in the medium are filled into glass vessels and incubated at about 37°C. The kidney cells thereupon settle at the bottom of the glass vessel. They propagate by cell division and soon form a dense cell layer. After about 3 – 4 days, the consumed culture medium is replaced by a new culture medium. After washing of the culture cell layer, usually after further 2 to 3 days, it is inoculated, for example in the case of Roux-dish cultures, with 0.5 ml and, in the case of tube cultures, with 0.1 ml of the corresponding virus suspension.

The cultivation and growing of the viruses is carried out in general at 37°C. The tissue culture cells multiply the virus and transfer the newly formed virus particles into the surrounding culture medium. The virus-containing medium of a cell culture is then used for the inoculation of the next cell culture and in this manner the attenuation passages are carried out.

When the virus obtained by the passages meets the criteria set up for the attenuation, the virus suspension can be used as vaccine. For this purpose, medium VM 2a or another, not serum-containing synthetic medium is used as culture medium. It may, furthermore, be suitable to add an adjuvant, for example aluminum hydroxide and to prepare a dry preparation by freeze-drying.

The virus attenuated to the invention is allowed to proliferate in a tissue culture of pigs' renal cells. As nutrient solution, preferably Hanks' solution with 0.5 percent of lactalbumin-hydrolysate, 10 percent of calf serum and 20 percent of TCM 199 is used. In addition, the nutrient solution may contain additions of antibiotics and phenyl red. After about 4 – 5 days, the nutrient solution is exchanged. After 8 days, the tissue culture, which in the meantime has grown up completely, is inoculated with the virus. The nutrient solution for the virus proliferation consists of Earle's solution with 0.5 percent lactalbumin-hydrolysate (without addition of serum). After incubation during 3 – 4 days at 37° C, the virus is harvested. The virus content is titrated in a culture tube. Thereafter, the virus-containing harvests are mixed with a stabilizer solution, preferably a solution of saccharose and glutamate, for example in a mixture of 50 : 50. Here, aluminum hydroxide may be added as adjuvant, for example in a quantity of 0.2 percent. This liquid vaccine is then filled into flasks having a capacity of 5 ml and freeze-dried.

Such a dry preparation is excellently suitable, after redissolving in a solvent, for example buffered distilled water, for the immunization of horses against horse-rhinopneumonitis (viral abortion of mares).

The advantages of the present vaccine over known rhinopneumonitis vaccines particularly the "Doll-vaccine" are that it can be applied intramuscularly and that it is practically free from undesired side effects.

The following Examples illustrate the invention but they are not intended to limit it thereto:

EXAMPLE 1

Mucus was taken with a sterile compress of cotton wool from the nostrils of an infected foal. The compress of cotton wool was rinsed in 5 ml of Hanks' medium. This rinsing liquid was centrifuged for 15 minutes at a low speed (3,000 rev./min). The supernatant (4.5 ml) was incubated for half an hour with 0.5 ml of a streptomycin-penicillin solution and 2 ml thereof were then inoculated on horse kidney cultures which had been grown in 100 ml Erlenmeyer flasks and had been covered with 10 ml of culture medium. The culture inoculated in such a manner was washed after absorption for a period of up to 24 hours, covered with maintenance medium (Hanks' solution with 0.5 percent of lactalbumin-hydrolysate, 2.0 percent of calf serum, antibiotic and phenol red) and then kept at 37°C. The harvested viruses were then subjected to 5 further passages through horse kidney cultures and then transferred to sheep kidney culture passages. For the inoculation, 2ml of the preceding passage were used and from the 20th passage on 1 ml was sufficient. Here too, Hanks' solution with 0.5 percent of lactalbumin-hydrolysate, 2.0 percent of calf serum, antibiotics and phenol red was used as the maintenance medium. The cultures were controlled microscopically, daily for 6 to 10 days. Each 5th passage was effected in serum-free medium and tested on golden hamsters for sufficient attenuation of the virus. This was reached after 25 sheep kidney culture passages. The virus-containing harvest of the 25th passage was recovered and combined with 0.1 percent of aluminum hydroxide. This vaccine has a virus content of $10^{6.0}CID_{50}$/ml.

EXAMPLE 2

Liver, lung, spleen and kidney were removed under sterile conditions from a aborted horse fetus and the individual organs were ground in a mortar with sodium chloride-phosphate buffer having a pH of 7.2, 100 IU/ml of penicillin, 100 gamma/ml of dihydrostreptomycin and sea sand, and centrifuged for 20 minutes at 3,000 rev./min. The supernatant of the centrifuged mixture was introduced in quantities of 0.5 ml each into at least four test tube cultures from piglets' kidneys (without maintenance medium) for absorption. After 2 hours absorption at 37°C in an incubator, the inoculation material was withdrawn from the cell culture and each of the cultures was covered with 2.0 ml of maintenance medium (sterile bovine amniotic liquid, antibiotics and phenol red). The cultures were daily controlled microscopically. When a specific cytopathogenic effect was observed, the supernatant of the cultures was transferred according to the adsorption method onto a new culture and the passages were continued in this manner. After about 5 passages, 0.1 ml of the supernatant of the preceding culture was sufficient for further passages. After 100 passages, 100 IU/ml only were transferred. Each 20th passage was tested on golden hamsters. At the 255th passage, the infectivity titer for golden hamster was reduced by 3 powers of 10. The decanted part of this passage was combined with 0.1 percent of aluminum hydroxide. The virus content amounted to $10^{7.0}$ $CID_{50}$/ml.

What is claimed is:

1. An intramuscular vaccination program against equine rhinopneumonitis (abortion of mares) in horses which consists in the steps of vaccinating, intramuscularly, a) foals at three months of age, and revaccinating foals intramuscularly three months later; and b) pregnant mares with a first dose between the second and third months of pregnancy and a second dose at the sixth to seventh months of pregnancy, with an intramuscular vaccine prepared by;

cultivating and multiplying rhinopneumonitis viruses, derived from a source selected from infected horses, infected foals, and aborted horse fetuses, in susceptible tissues selected from susceptible organs, susceptible test animals, and susceptible permanent cell lines suitable for the cultivation and multiplication of said viruses, said multiplying involving from three to ten passages;

completely attenuating the viruses until they have lost pathogenicity for the horse by passing the viruses, in at least twenty continuous passages, through primary cell cultures selected from kidneys of sheep, pigs, and piglets and from stable permanent cell lines derived from said primary cell cultures;

harvesting the virus-containing material, combining the harvested material with an aluminum hydroxide or phosphate adjuvant, and freeze drying the material;

said harvested material meeting the following criteria for complete attenuation:

a. the infectuosity titer for golden hamsters after intraperitoneal infection must be reduced by 3 powers of 10 with respect to the starting value;

b. over 70 percent of golden hamsters, inoculated with the attenuated virus (0.5 ml, parenterally) and 3 weeks later infected intraperitoneally with the virulent starting virus (10,000 $LD_{50}$/ml), must survive the challenge infection;

c. highly pregnant mares between the 7th and 9th month of pregnancy, which are susceptible to the viral abortion virus, must not become diseased and abort after intramuscular or subcutaneous injection of the attenuated virus (5 ml, virus titer between $10^{6.5}$ and $10^{7.5} CID_{50}$/ml) and local vaccination reactions must not occur (after the first vaccination, a short-time biphasal fever attack between the 18th and the 48th hour and between the 8th and the 9th day is unobjectionable; after the second vaccination, however, no fever reaction must occur); and d. foals at the age of 2 – 3 months which do not have specific antibodies against rhinopneumonitis virus must not become diseased after parenteral injection with the attenuated virus.

2. The method of preparing a vaccine for the intramuscular vaccination of horses against equine rhinopneumonitis (abortion of mares) which comprises:

cultivating and multiplying rhinopneumonitis viruses in susceptible tissues selected from susceptible organs, susceptible test animals, and susceptible permanent cell lines suitable for the cultivation and multiplication of said viruses, said multiplying involving from three to ten passages;

completely attenuating the viruses until they have lost pathogenicity for the horse by passing the viruses, in at least 20 continuous passages, through primary cell cultures selected from kidneys of sheep, pigs, and piglets and from stable permanent cell lines derived from said primary cell cultures; and harvesting the virus-containing material;

said harvested material meeting the following criteria for complete attenuation:

a. the infectuosity titer for golden hamsters after intraperitoneal infection must be reduced by 3 powers of 10 with respect to the starting value;

b. over 70 percent of golden hamsters, inoculated with the attenuated virus (0.5 ml parenterally) and 3 weeks later infected intraperitoneally with the virulent starting virus (10,000 $LD_{50}$/ml), must survive the challenge infection;

c. highly pregnant mares between the 7th and 9th month of pregnancy, which are susceptible to the viral abortion virus, must not become diseased and abort after intramuscular or subcutaneous injection of the attenuated virus (5 ml, virus titer between $10^{6.5}$ and $10^{7.5} CID_{50}$/ml) and local vaccination reactions must not occur (after the first vaccination, a short-time biphasal fever attack between the 18th and the 48th hour and between the 8th and the 9th day is unobjectionable; after the second vaccination, however, no fever reaction must occur); and d. foals at the age of 2 – 3 months which do not have specific antibodies against rhinopneumonitis virus must not become diseased after parenteral injection with the attenuated virus.

3. A vaccine for the intramuscular vaccination of horses against equine rhinpheumonitis (abortion of mares) prepared by the method of claim 2.

4. The method of protecting horses against equine rhinopneumonitis (abortion of mares) which comprises intramuscularly vaccinating said horses with a vaccine prepared by the method of claim 2.

* * * * *